(12) United States Patent
Zhang et al.

(10) Patent No.: US 11,860,316 B1
(45) Date of Patent: Jan. 2, 2024

(54) SYSTEMS AND METHOD FOR DEBRIS AND WATER OBFUSCATION COMPENSATION FOR USE IN LIDAR SYSTEMS

(71) Applicant: INNOVUSION IRELAND LIMITED, Los Altos, CA (US)

(72) Inventors: Rui Zhang, Palo Alto, CA (US); Yimin Li, Cupertino, CA (US); Junwei Bao, Los Altos, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 963 days.

(21) Appl. No.: 16/545,250

(22) Filed: Aug. 20, 2019

Related U.S. Application Data

(60) Provisional application No. 62/720,370, filed on Aug. 21, 2018.

(51) Int. Cl.
| | |
|---|---|
| *G01S 7/497* | (2006.01) |
| *G01S 7/481* | (2006.01) |
| *G01S 17/10* | (2020.01) |
| *G01S 17/931* | (2020.01) |

(52) U.S. Cl.
CPC ............ *G01S 7/497* (2013.01); *G01S 7/4813* (2013.01); *G01S 17/10* (2013.01); *G01S 17/931* (2020.01); *G01S 2007/4977* (2013.01)

(58) Field of Classification Search
CPC ...... G01S 7/497; G01S 17/931; G01S 7/4813; G01S 17/10; G01S 2007/4977
USPC ...................................................... 356/4.01
See application file for complete search history.

(56) References Cited

U.S. PATENT DOCUMENTS

| | | |
|---|---|---|
| 3,897,150 A | 7/1975 | Bridges et al. |
| 4,464,048 A | 8/1984 | Farlow |
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

"Mirrors", Physics LibreTexts, https://phys.libretexts.org/Bookshelves/Optics/Supplemental_Modules_(Components)/Mirrors, (2021), 2 pages.

(Continued)

*Primary Examiner* — Mahmoud S Ismail
(74) *Attorney, Agent, or Firm* — Mauriel Kapouytian Woods LLP; Liang Huang

(57) ABSTRACT

Embodiments discussed herein refer to systems and methods that compensate for debris and water obfuscation that affect operation of LiDAR systems. A debris management system can direct air and/or fluid over a portion of the LiDAR system to remove any debris or water.

20 Claims, 11 Drawing Sheets

(56) References Cited

U.S. PATENT DOCUMENTS

| | | |
|---|---|---|
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshineya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B2 | 6/2015 | Robinson |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,823,353 B2 | 11/2017 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,451,716 B2 | 10/2019 | Hughes et al. |
| 10,502,831 B2 | 12/2019 | Eichenholz |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2007/0291130 A1* | 12/2007 | Broggi ............... G01S 17/931 |
| | | 348/E13.015 |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0188762 A1* | 7/2010 | Cook ............... G02B 27/0927 |
| | | 359/858 |
| 2010/0271614 A1 | 10/2010 | Albuquerque et al. |
| 2011/0181864 A1 | 7/2011 | Schmitt et al. |
| 2011/0279803 A1* | 11/2011 | Ulrich ............... G03F 7/70308 |
| | | 355/67 |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |

(56) References Cited

U.S. PATENT DOCUMENTS

| | | | |
|---|---|---|---|
| 2018/0040171 A1 | 2/2018 | Kundu et al. | |
| 2018/0050704 A1 | 2/2018 | Tascione et al. | |
| 2018/0069367 A1 | 3/2018 | Villeneuve et al. | |
| 2018/0143298 A1* | 5/2018 | Newman | G01C 21/3484 |
| 2018/0152691 A1 | 5/2018 | Pacala et al. | |
| 2018/0158471 A1 | 6/2018 | Vaughn et al. | |
| 2018/0164439 A1 | 6/2018 | Droz et al. | |
| 2018/0156896 A1 | 7/2018 | O'Keeffe | |
| 2018/0188355 A1 | 7/2018 | Bao et al. | |
| 2018/0188357 A1 | 7/2018 | Li et al. | |
| 2018/0188358 A1 | 7/2018 | Li et al. | |
| 2018/0188371 A1 | 7/2018 | Bao et al. | |
| 2018/0210084 A1 | 7/2018 | Zwölfer et al. | |
| 2018/0275274 A1 | 9/2018 | Bao et al. | |
| 2018/0284241 A1 | 10/2018 | Campbell et al. | |
| 2018/0284242 A1 | 10/2018 | Campbell | |
| 2018/0284268 A1* | 10/2018 | McWhirter | G01S 17/42 |
| 2018/0284286 A1 | 10/2018 | Eichenholz et al. | |
| 2018/0329060 A1 | 11/2018 | Pacala et al. | |
| 2018/0354468 A1* | 12/2018 | Krishnan | B60S 1/56 |
| 2018/0359460 A1 | 12/2018 | Pacala et al. | |
| 2019/0025428 A1 | 1/2019 | Li et al. | |
| 2019/0107607 A1 | 4/2019 | Danziger | |
| 2019/0107623 A1 | 4/2019 | Campbell et al. | |
| 2019/0120942 A1 | 4/2019 | Zhang et al. | |
| 2019/0120962 A1 | 4/2019 | Gimpel et al. | |
| 2019/0154804 A1 | 5/2019 | Eichenholz | |
| 2019/0154807 A1 | 5/2019 | Steinkogler et al. | |
| 2019/0202410 A1* | 7/2019 | Zhao | B60S 1/56 |
| 2019/0212416 A1 | 7/2019 | Li et al. | |
| 2019/0250254 A1 | 8/2019 | Campbell et al. | |
| 2019/0257924 A1 | 8/2019 | Li et al. | |
| 2019/0265334 A1 | 8/2019 | Zhang et al. | |
| 2019/0265336 A1 | 8/2019 | Zhang et al. | |
| 2019/0265337 A1 | 8/2019 | Zhang et al. | |
| 2019/0265339 A1 | 8/2019 | Zhang et al. | |
| 2019/0277952 A1 | 9/2019 | Beuschel et al. | |
| 2019/0310368 A1 | 10/2019 | LaChapelle | |
| 2019/0351464 A1* | 11/2019 | Kim | B08B 3/02 |
| 2019/0369215 A1 | 12/2019 | Wang et al. | |
| 2019/0369258 A1 | 12/2019 | Hall et al. | |
| 2019/0383915 A1 | 12/2019 | Li et al. | |
| 2020/0142070 A1 | 5/2020 | Hall et al. | |
| 2020/0256964 A1 | 8/2020 | Campbell et al. | |
| 2020/0284906 A1 | 9/2020 | Eichenholz et al. | |
| 2020/0319310 A1 | 10/2020 | Hall et al. | |
| 2020/0400798 A1 | 12/2020 | Rezk et al. | |
| 2021/0088630 A9 | 3/2021 | Zhang | |
| 2021/0323509 A1* | 10/2021 | Rice | B60S 1/522 |
| 2021/0362688 A1* | 11/2021 | Kawamura | B60S 1/54 |

FOREIGN PATENT DOCUMENTS

| | | |
|---|---|---|
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| EP | 3914932 A1 | 12/2021 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| JP | 2018072288 A | 5/2018 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |
| WO | 2023091891 A1 | 5/2023 |

OTHER PUBLICATIONS

"Why Wavelengths Matter in Fiber Optics", FirstLight, https://www.firstlight.net/why-wavelengths-matter-in-fiber-optics/, (2021), 5 pages.

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

(56) References Cited

OTHER PUBLICATIONS

"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.

* cited by examiner

SYSTEMS AND METHOD FOR DEBRIS AND WATER OBFUSCATION COMPENSATION FOR USE IN LIDAR SYSTEMS

CROSS-REFERENCE TO A RELATED APPLICATION

This application claims the benefit of U.S. Provisional Application No. 62/720,370, filed Aug. 21, 2018, the disclosure of which is incorporated herein in its entirety.

FIELD OF THE INVENTION

The present disclosure relates generally to laser scanning and, more particularly, to systems and methods that compensate for debris and water obfuscation that affect operation of LiDAR systems.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud.

LiDAR systems used in the field may be subjected to an array of environmental conditions that hamper or affect the operational performance of the LiDAR system. For example, debris such as dirt, road grime, bird droppings, pollen, tree sap, water, etc. may block or prevent light pulses from being cast out beyond the immediate vicinity of the LiDAR system, thereby preventing it from obtaining the image or point cloud necessary to function properly. Accordingly, systems and methods that compensate for debris and water obfuscation that affect operation of LiDAR systems are needed.

BRIEF SUMMARY

Embodiments discussed herein refer to systems and methods that compensate for debris and water obfuscation that affect operation of LiDAR systems.

In one embodiment, a debris management system is provided that can include LiDAR system, a cover for the LiDAR system that comprises at least one light transmissive portion, and a debris removal system operative to remove debris from the at least one light transmissive portion of the cover, the debris removal system comprising at least one nozzle operative to direct compressed air over the at least one light transmissive portion of the cover.

In another embodiment, a process for detecting presence of debris in connection with a light detection and ranging (LiDAR) system is provided. The process can include evaluating scatter return signals associated with a first light path, evaluating scatter return signals associated with a second light path, determining whether any of the evaluated scatter return signals associated with the first and second exit paths indicate existence of a blockage event, and if the blockage event is determined to exist, performing a corrective action to remove debris associated with the blockage event.

In yet another embodiment, a process for clearing debris from a LiDAR system is provided. The process can include monitoring the LiDAR system for at least one blocked region, determining which one or more nozzles to activate based on the at least one blocked region, and selectively activating the determined one or more nozzles to remove debris located at the at least one blocked region.

A further understanding of the nature and advantages of the embodiments discussed herein may be realized by reference to the remaining portions of the specification and the drawings.

DETAILED DESCRIPTION

Figure 1:
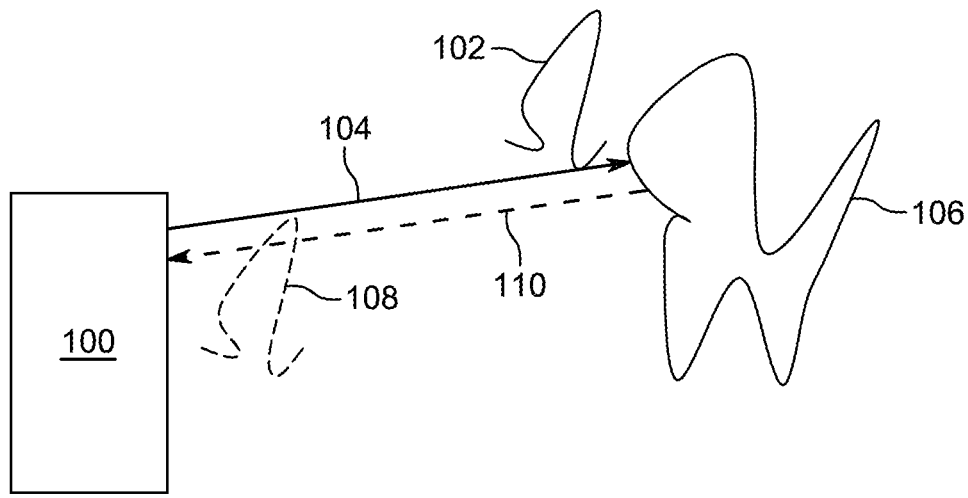
FIGS. 1-3 illustrate an exemplary LiDAR system using pulse signals to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Embodiments discussed herein provide systems and methods for compensating for debris or other light obfuscating matter that can affect the performance of a LiDAR system. As will be explained in connection with FIGS. 1-4 below, light pulses are transmitted from a light source to a field of view of the LiDAR system, and return pulses are detected and used to construct a point map of the field of view. Systems and methods discussed herein can remove the debris and/or compensate for the presence of the debris to ensure minimum performance standards of the LiDAR system. The basics principles of LiDAR operation is now discussed.

LiDAR systems can use time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
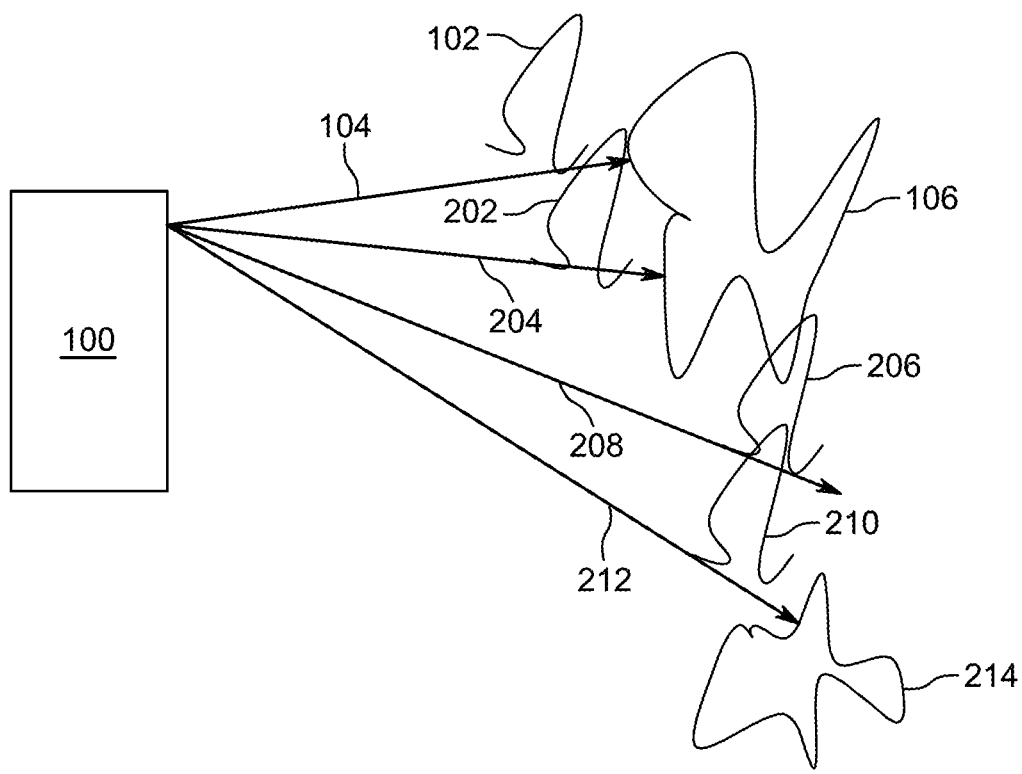
Figure 3:
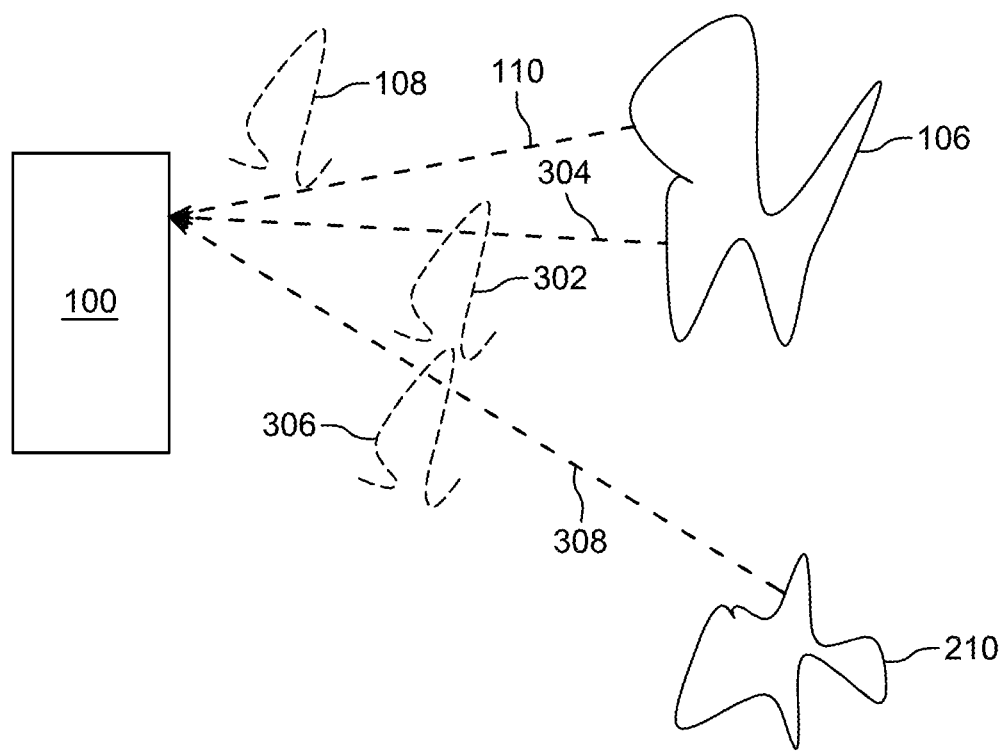

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 MHz (and thus improving the density of points of the system) would significantly reduce the detection range of the system.

Figure 4:
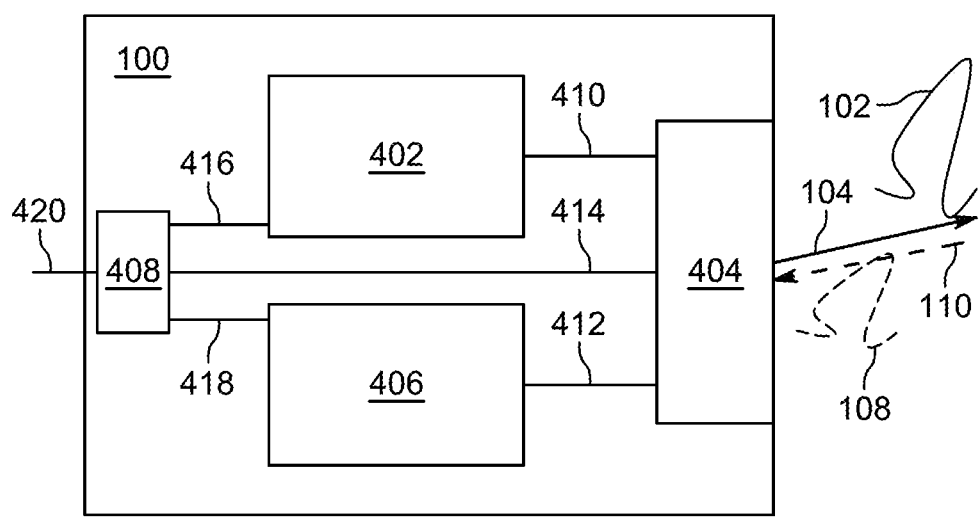
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 5:
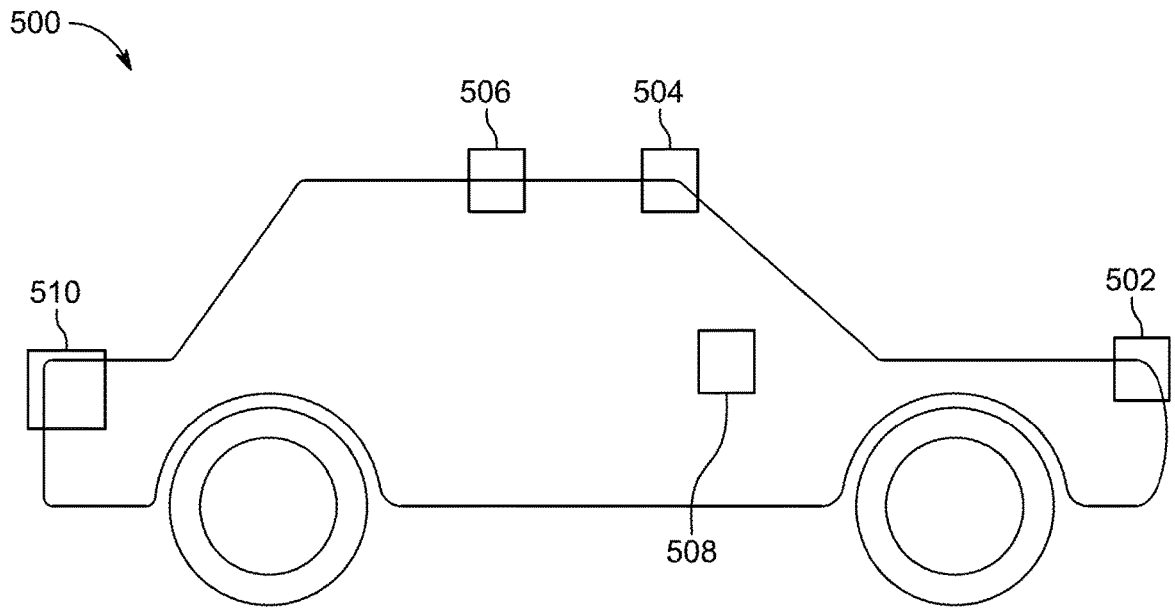
FIG. 5 shows several potential LiDAR locations on a vehicle according to an embodiment.

FIG. 5 shows several potential LiDAR locations on vehicle 500 according to an embodiment. The LiDAR locations are represented by generic boxes, as shown. Each box may represent a portion of a larger more comprehensive LiDAR system that is distributed throughout vehicle 500 or each box can represent an independent and self-contained LiDAR system. Regardless of how each box is represented, light beams are emitted from each box so that data points are obtained to represent the field of view observed by that particular box. Box 502 is located near the front of vehicle 500 and may be used to capture a field of view immediately in front of the vehicle. Box 504 is located at or near the roof and front portion of vehicle 500. Box 504 may also be used to capture a field of view in front of vehicle. Box 506 may be located on the roof near the middle or back portion of vehicle 500. Box 506 may be used to capture a field of view on a side of vehicle. Although not shown, another box similar to box 506 may be located on the other side of vehicle so that the field view on the other side of vehicle is obtained. Box 508 may be positioned on a side of vehicle 500 (e.g., near, on, or integrated with side mirror). Box 508 may be used to obtain a side field of view. Box 510 is located near the rear of vehicle 500 and may be used to obtain a rear field of view.

Each of boxes 502, 504, 506, 508, and 510 may be positioned on or within vehicle 500 in a manner which may require use of debris detection and removal systems according to embodiments discussed herein to remove any debris or water that collects on an outside surface of one of the boxes. Debris detection and removal systems according to embodiments can be used when, for example, conventional (already existing) cleaning and wiping systems typically found on vehicles cannot be used. For example, most vehicles have windshield wipers and spray nozzles for spraying water onto the windshield. If a box were located behind the windshield, the windshield wipers and/or spray nozzles can be used to remove water and/or debris that collected on the windshield.

Figure 6:
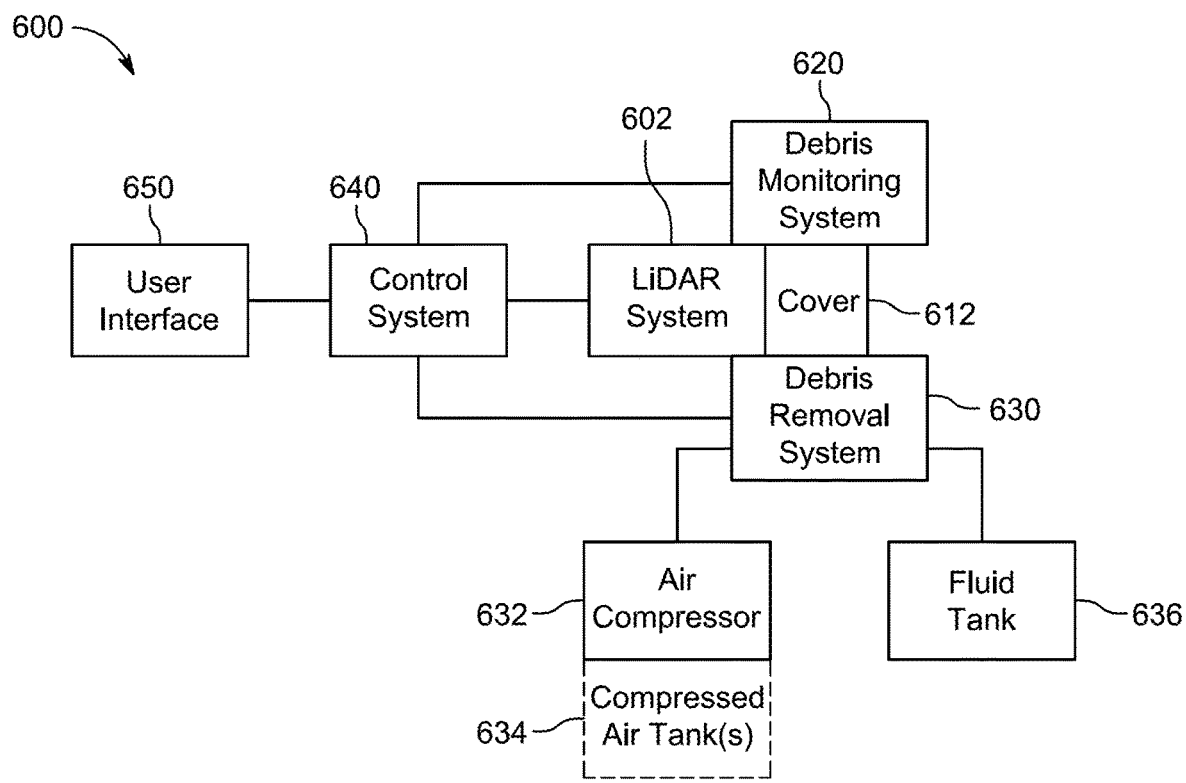
FIG. 6 shows an illustrative debris detection and removal system according to an embodiment.

FIG. 6 shows illustrative debris detection and removal system 600 according to an embodiment. System 600 can include LiDAR system 602, cover 612, debris monitoring system 620, debris removal system 630, control system 640, and user interface 650. Debris removal system 630 may be connected to one or more of air compressor 632, compressed air tank(s) 634, and fluid tank 636. LiDAR system 602 may embody the discussion corresponding to FIGS. 1-4, discussed above. Cover 612 may protect LiDAR system from environmental elements and includes a light transmissive portion that allows light energy to pass through cover 612. It is cover 612 that accumulates debris that affects operation of LiDAR system 602. Debris can include water such as water droplets, organic matter such as dirt, vegetation, bird droppings, pollen, and bugs, and inorganic matter such as tar, plastic, road grime, etc.

Debris monitoring system 620 is operative to monitor cover 612 and/or components internal to LiDAR system 602 for debris. In some embodiments, debris monitoring system 620 can leverage signals obtained by LiDAR system 602 to make a determination as to whether any debris is present. The signals leveraged by monitoring system 620 can include scatter signals, back reflection signals, or other signals that are typically discarded by the system as such signals are not needed for detecting objects located with the field of view. These signals may be generated as a byproduct of the light pulse interactions with internal mirrors and the cover. In other embodiments, monitoring system 620 may use a camera or any other suitable sensor to detect whether any debris is present. When monitoring system 620 detects presence of debris, control system 640 may instruct debris removal system 630 to remove the debris. If, after activation of debris removal system 630, debris is still detected as present, control system 640 may instruct user interface 650 to inform a user that debris removal is required or that the LiDAR system and its corresponding functionality has been temporarily deactivated due to the debris or detection of an object covering or blocking cover 612.

Debris removal system 630 is operative to remove any debris that may exist on cover 612 or within LiDAR system 602. Removal system 630 may include one or more air nozzles that direct compressed air to specific locations on cover 612 or within LiDAR system 602. The compressed air may be supplied by air compressor 632 or compressed air tank(s) 634. In some embodiments, air compressor 632 may charge air tank(s) 634. Removal system 630 can include fluid tank 636. Fluid tank 636 may contain water or other solvent that may be ejected by one or more fluid ports on to cover 612. In some embodiments, fluid tank 636 may be the same as an existing windshield wiper fluid tank in a vehicle. In another embodiment, compressed air and fluid may be combined so that the fluid is projected onto the cover with greater force.

Control system 640 is operative to control operation of debris removal system 600. For example, control system 640 may process signals received from debris monitoring system 620 or LiDAR system 602. Control system 640 may control operation of debris removal system 630. For example, system 640 may control which air nozzles (not shown) are activated and which fluid ports (not shown) are activated. Control system 640 may control user interface 650 and have the ability to temporarily shut down LiDAR system 602. User interface 650 may include audio or visual indicators. In some embodiments, user interface 650 may be integrated with a communications system of the vehicle (e.g., stereo, touch screen, navigation screen, or any suitable display or audio device) so that it can provide instructions, warnings, or status updates to a user of the vehicle. In other embodiments, user interface 650 may include wireless communications circuitry that communicates with a user device (e.g., an application running on the user's device) and instructs the user device to provide messages to the user.

Figure 7A:
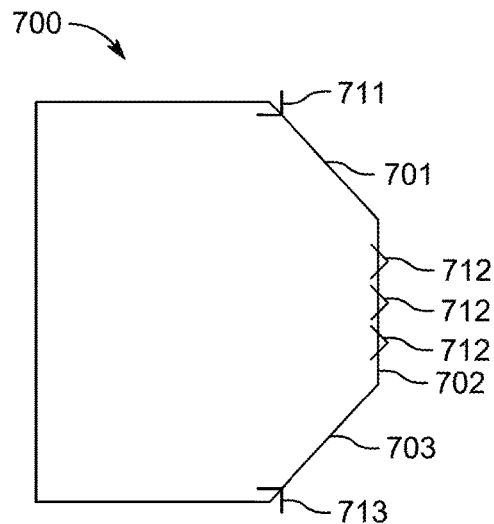
FIGS. 7A-7D show illustrative top and front views, respectively, of different covers according to various embodiments.
Figure 7B:
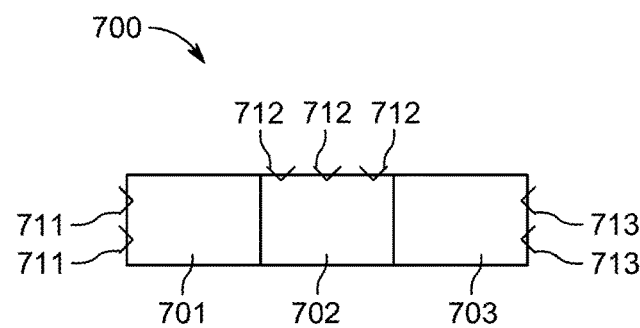

FIGS. 7A and 7B show illustrative top and front views, respectively, of cover 700 having air nozzles and fluid ports disposed in various locations according to an embodiment. Cover 700 can be shaped as shown, and any one or more of sides 701-703 may include a light transmissive portion that permits light to pass between an interior and exterior of cover 700. In some embodiments, light pulses may be transmitted through only one of sides 701-703. FIGS. 7A and 7B show several arrow shaped elements 711-713 disposed in different locations on cover 700. Arrow shaped elements 711-713 can represent a nozzle, a fluid port, or a combination nozzle/fluid orifice. Elements 711 are associated with side 701, elements 712 are associated with side 702, and elements 713 are associated with side 703. Elements 711 may be mounted to direct air and/or fluid across a side 701 (e.g., in a horizontal direction). Elements 712 may be mounted direct air and/or fluid across a side 702 (e.g., in a vertical direction). Elements 713 may be mounted to direct air and/or fluid across side 703 (e.g., in a horizontal direction).

Figure 7C:
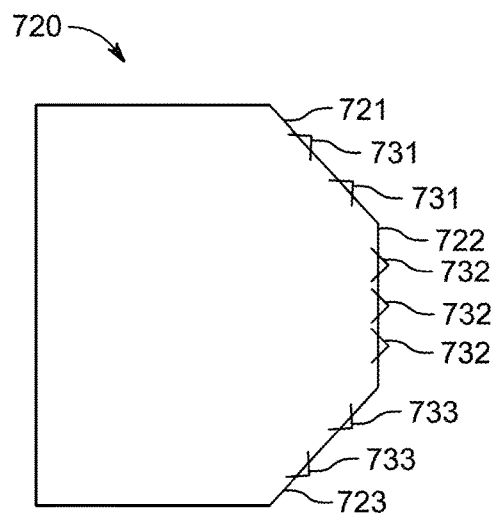
Figure 7D:
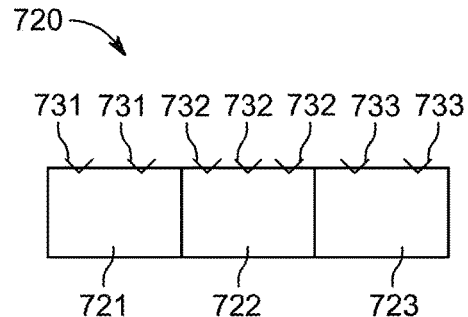

FIGS. 7C and 7D show illustrative top and front views, respectively, of cover 720 having air nozzles and fluid ports disposed in various locations according to an embodiment. Cover 720 is similar to cover 700, and includes sides 721-723, but has elements 731-733 arranged different than those of cover 700. As shown, all of elements 731-733 are arranged to direct air and/or fluid across their respective sides in a vertical direction (e.g., top to bottom).

Figure 8A:
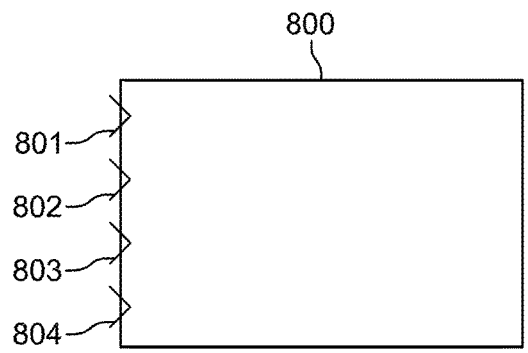
FIGS. 8A-8D show illustrative views of a side of a cover according to an embodiment.
Figure 8B:
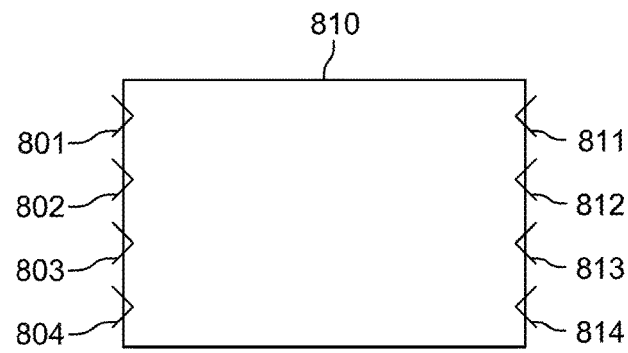

FIGS. 8A-8D show illustrative views of a side of a cover according to an embodiment. For example, the side shown in FIGS. 8A-8B can represent one of the sides of cover 700 or 720. FIG. 8A shows four orifice elements 801-804 arranged on the left edge of cover side 800 and operative to direct air/fluid from left to right. Orifice elements 801-804 can be an air nozzle, a fluid port, or a combination nozzle/fluid orifice. FIG. 8B shows four orifice elements 801-804 arranged on the left edge of cover side 810 and four orifice elements 811-814 arranged on the right edge of cover side 810. Orifice elements 801-804 are operative to direct air/fluid from left to right and orifice elements 811-814 are operative to direct air/fluid from right to left.

Figure 8C:
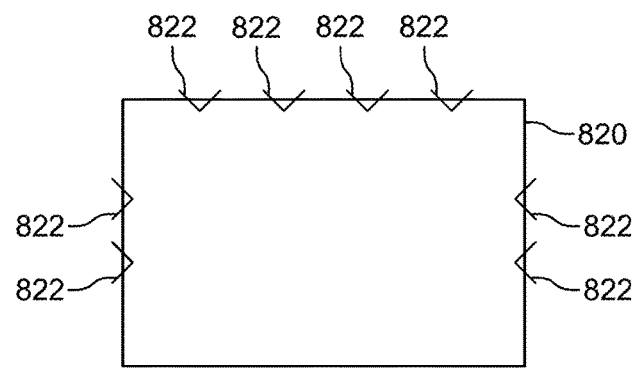
Figure 8D:
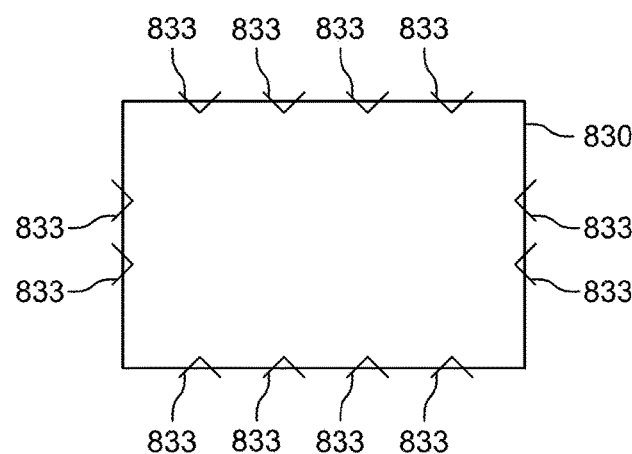

FIG. 8C shows cover side 820 with orifice elements 822 arranged on three edges, as shown. With this arrangement, air/fluid can be directed from left to right, right to left, and top to bottom. FIG. 8D shows cover side 830 with orifice elements 833 arranged on four edges, as shown. With this arrangement, air/fluid can be directed from left to right, right to left, top to bottom, and bottom to top.

The different orifice arrangements can enable selective activation of one or more orifice elements to spot target selective locations of the cover side. For example, using the arrangement of FIG. 8A, if a blockage is detected in the upper most row region of cover side 800, the system may activate only orifice 801 to remove the debris. Selective activation of one or more orifices can conserve resources. As another example, assume debris is detected in two different locations on cover side 830. Depending on the size of each debris particle, one or more orifices may be activated to provide localized air/fluid to the locations of the debris particles. As a specific example, if a small particle exists on the upper left portion, two orifice elements (e.g., one on the left edge and one on the top edge) may be activated to remove that particle. If a large particle exists, then three or more orifice elements may be activated.

Figure 9:
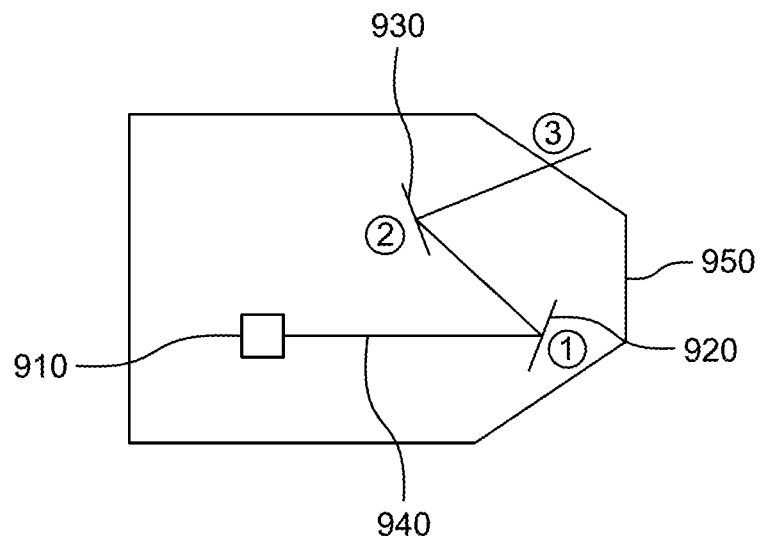
FIG. 9 shows an illustrative arrangement of components of a LiDAR system within a cover according to an embodiment.

FIG. 9 shows an illustrative arrangement of components of a LiDAR system within a cover according to an embodiment. The components of the LiDAR system are shown with cover can include light source 910, mirror 920, and mirror 930. Illustrative light path 940 originates at light source 910, interacts with mirror 920, which redirects the path to mirror 930, which further redirects the path through cover 950. Three different interaction points exist for path 940. The first interaction point (shown by the encircled number 1) occurs at mirror 920. The second interaction point (shown by the encircled number 2) occurs at mirror 930. The third interaction point (shown by the encircled number 3) exists at cover interface 950. Light interaction at each interaction point produces a response that is reflected back to receiving optics/detector. The reflections caused by mirrors 920 and 930 and cover 950 is sometimes referred to as scatter, or back reflection, and typically represents garbage signals that are discarded by filters or processing software. This scatter data, however, can be used to detect whether an object exist on cover 950.

Figure 10:
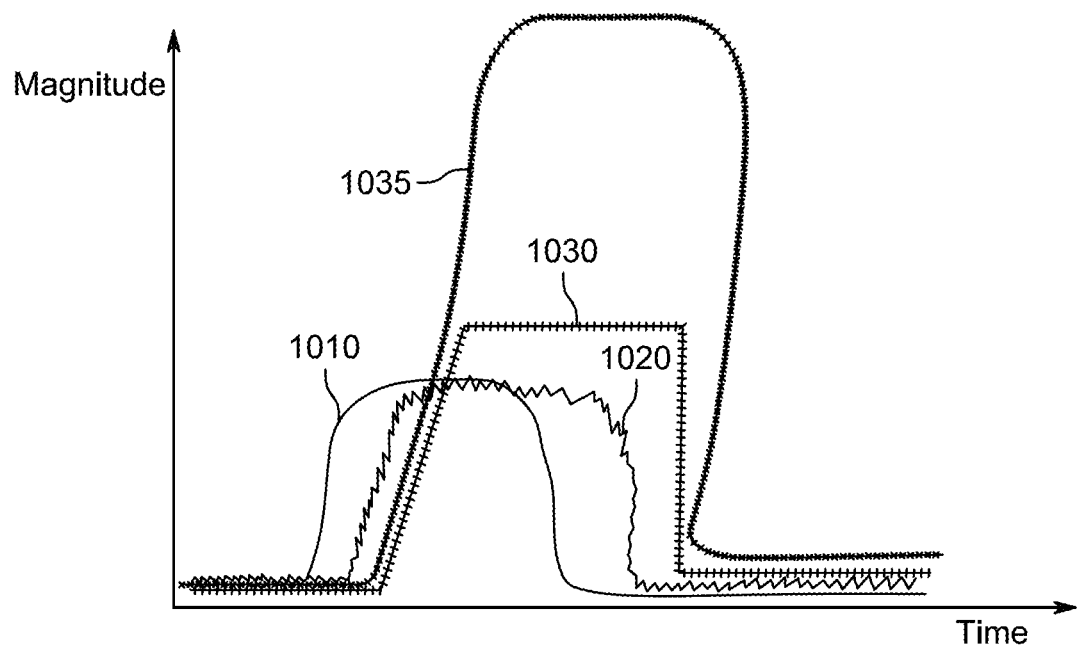
FIG. 10 shows an illustrative timing diagram according to an embodiment.

FIG. 10 shows an illustrative timing diagram according to an embodiment. In particular, FIG. 10 shows several waveforms that correspond to the three interaction points of FIG. 9. Waveform 1010 can represent the scatter signal resulting from the light interaction with mirror 920 at interaction point 1. Waveform 1020 can represent the scatter signal resulting from the light interaction with mirror 930 at interaction point 2. Waveform 1030 can represent the scatter signal resulting from the light interaction with cover 950 at interaction point 3. Waveforms 1010, 1020, and 1030 represent normal magnitude responses that would typically be expected in a LiDAR system such as that illustrated in FIG. 9 when no debris is present. If debris exists on any of interaction points 1-3, then the resulting waveform would have a substantially large magnitude that exceeds a debris threshold (not shown). For example, waveform 1035 represents scatter signal from interaction point 3 when debris is present. As shown, the magnitude is substantially larger when debris is present on cover 950 than when no debris is present (i.e., waveform 1030). By evaluating the scatter signal, processing circuitry (e.g., control system 640 or debris monitoring system 620) can detect whether debris is present on the cover or internally within the LiDAR system. Based on the evaluation, a control system (e.g., control system 640) can instruct a debris removal system (e.g., system 630) to activate to remove the debris.

Figure 11:
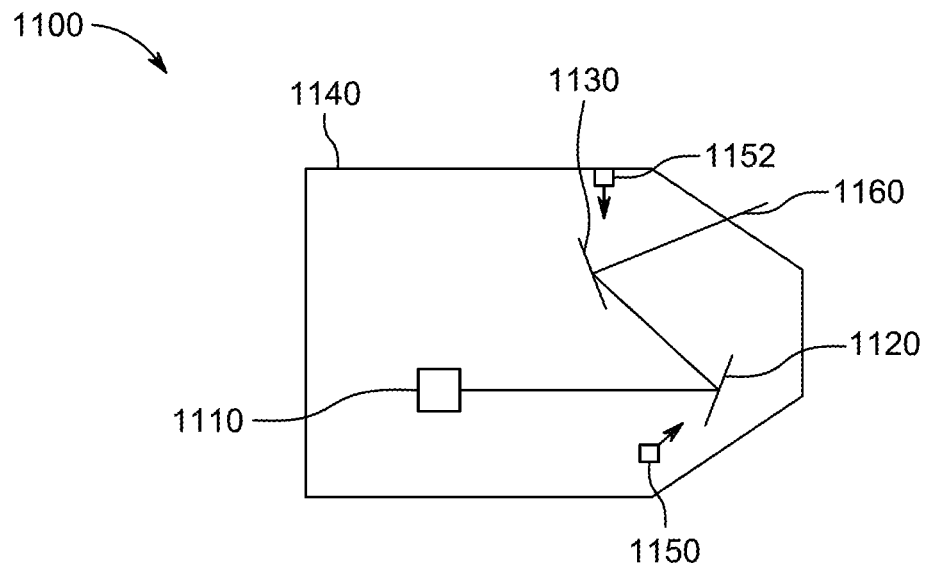
FIG. 11 shows an illustrative LiDAR system with integrated air nozzles according to an embodiment.

FIG. 11 shows an illustrative LiDAR system 1100 with internally integrated air nozzles according to an embodiment. LiDAR system 1100 can include light source 1110, first mirror 1120, second mirror 1130, cover 1140, and air nozzles 1150 and 1152. Light may travel along path 1160. Air nozzle 1150 is directed towards and operative to blow air onto first mirror 1120. Air nozzle 1152 is directed towards and operative to blow air onto second mirror 1130. Strategic placement of air nozzles such as air nozzles 1150 and 1152 can be used to self-clean the internal components within cover 1140. This can be useful as dust and debris can potentially infiltrate cover 1140 and adhere to various components contained therein. The light scattering detection method discussed above in connection with FIGS. 9 and 10 can be used to detect presence of debris located on mirrors 1120 and 1130. Alternatively, one or more cameras or other sensors can be used to detect presence of debris contained within cover 1140.

Figure 12:
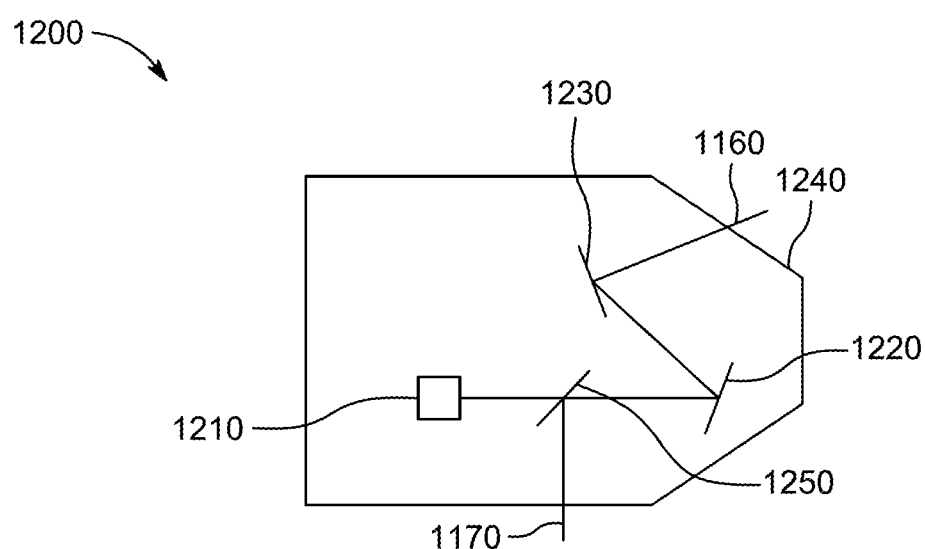
FIG. 12 shows an illustrative LiDAR system configured for both near field and far field object detection, according to an embodiment.

FIG. 12 shows an illustrative LiDAR system 1200 configured for both near field and far field object detection, according to an embodiment. LiDAR system 1200 can include light source 1210, first mirror 1220, second mirror 1230, cover 1240, and near field mirror 1250. Light path 1160, which uses first and second mirrors 1120 and 1130, is used for far field object detection. Far field object detection may be the mode by which LiDAR system 1200 is able to detect objects in the field of view at a minimum distance (e.g., greater than 1.5 meters). Light path 1170, which uses near field mirror 1150, is used for near field object detection. Near field object detection is a mode by which LiDAR system 1200 detects objects from approximately meters to a minimum distance (e.g., 1.5 meters). Near field object detection can be used to detect whether an object is located within the near field. For example, if the vehicle is carrying a cargo rack, and an item stored in the rack is partially draped over LiDAR system 1200, the near field object detection can detect that draped object.

Figure 13:
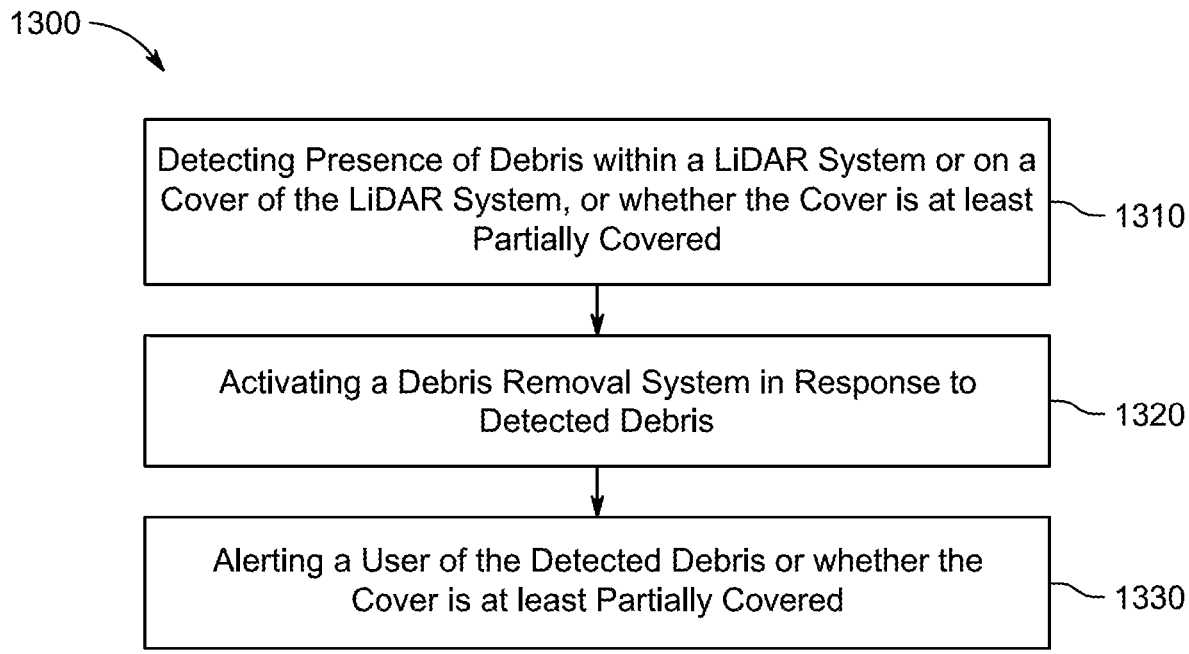
FIG. 13 shows an illustrative process according to an embodiment.

FIG. 13 shows illustrative process 1300 according to an embodiment. Starting at step 1310, the presence of debris can be detected within a LiDAR system or on a cover of the LiDAR system, or whether the cover is at least partially covered. Debris within the LiDAR system or on the cover can be detected using the scatter reflection signals as discussed above in connection with FIGS. 9 and 10. Alternatively, other sensors such as cameras can be used to detect whether debris is present. Detecting whether the cover is at least partially blocked can be performed using a near field object detector such as that discussed in FIG. 12.

At step 1320, a debris removal system can be activated in response detected debris. The debris removal system may use compressed air to remove the debris, a fluid such as water to remove the debris, or a combination of compressed air and fluid to remove the debris. At step 1330, a user may be optionally alerted to the presence of detected debris or that the cover is at least partially covered. The user may be alerted only if the debris removal system is unable to remove the debris or if the cover is covered.

It should be understood that the steps shown in FIG. 13 are merely illustrative and that additional steps may be added or existing steps may be omitted.

Figure 14:
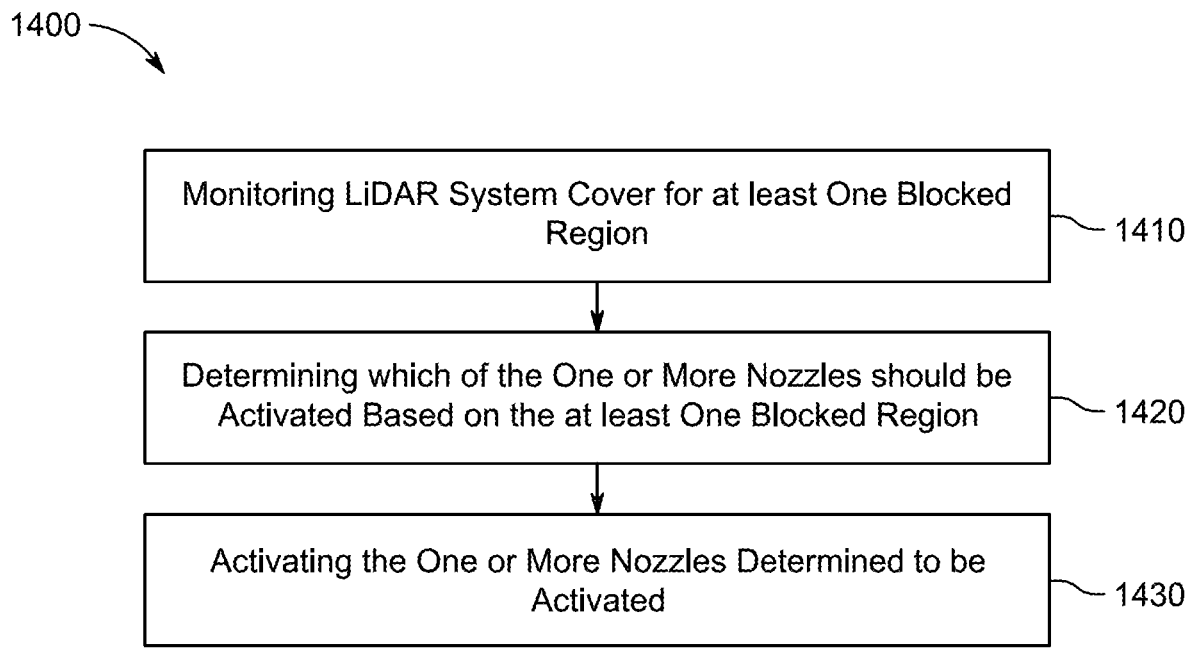
FIG. 14 shows an illustrative process for clearing debris according to an embodiment.

FIG. 14 shows illustrative process 1400 for clearing debris according to an embodiment. Starting at step 1410, a LiDAR system cover is monitored for at least one blocked region. A blocked region may be an area or portion of the cover that is covered with debris (e.g., dirt, water, grime, etc.). In some scenarios, different portions of the cover can be blocked. At step 1420, a determination is made as to which one or more nozzles should be activated based on the at least one blocked region. In an effort to conserve resources, only a subset of all available nozzles may be needed to be activated to remove debris from the at least one block region. For example, FIGS. 8A-8D show several different arrangements in which multiple nozzles are available. In any of these arrangements, only a subset of nozzles may be activated. At step 1430, one or more nozzles are activated based on the determination of which nozzles should be activated to remove the debris present at the at least one blocked region.

It should be understood that the steps shown in FIG. 14 are merely illustrative and that additional steps may be added or existing steps may be omitted.

Figure 15A:
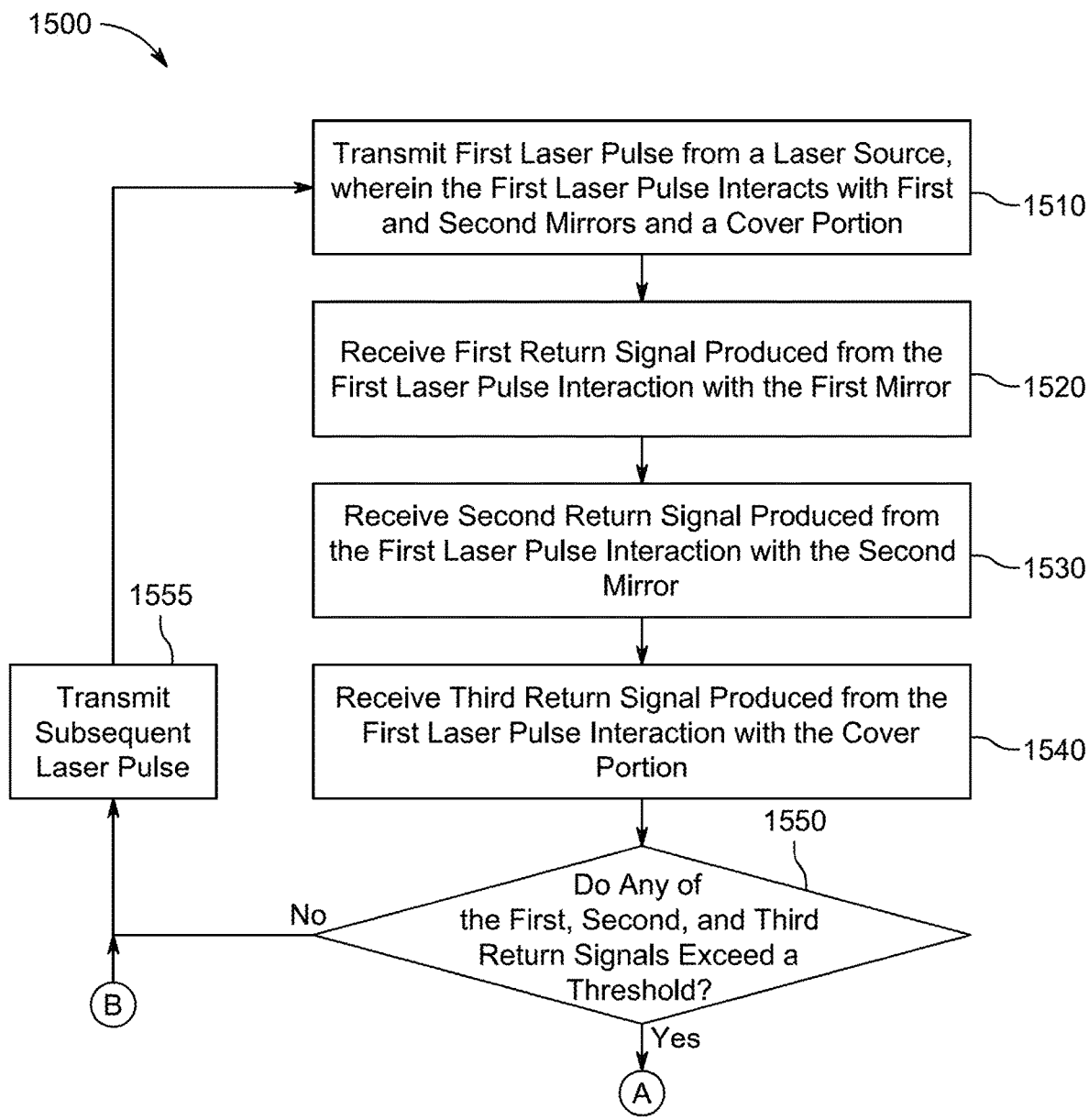
FIGS. 15A and 15B show illustrative process for using a LiDAR system for detecting whether debris is present according to an embodiment.
Figure 15B:
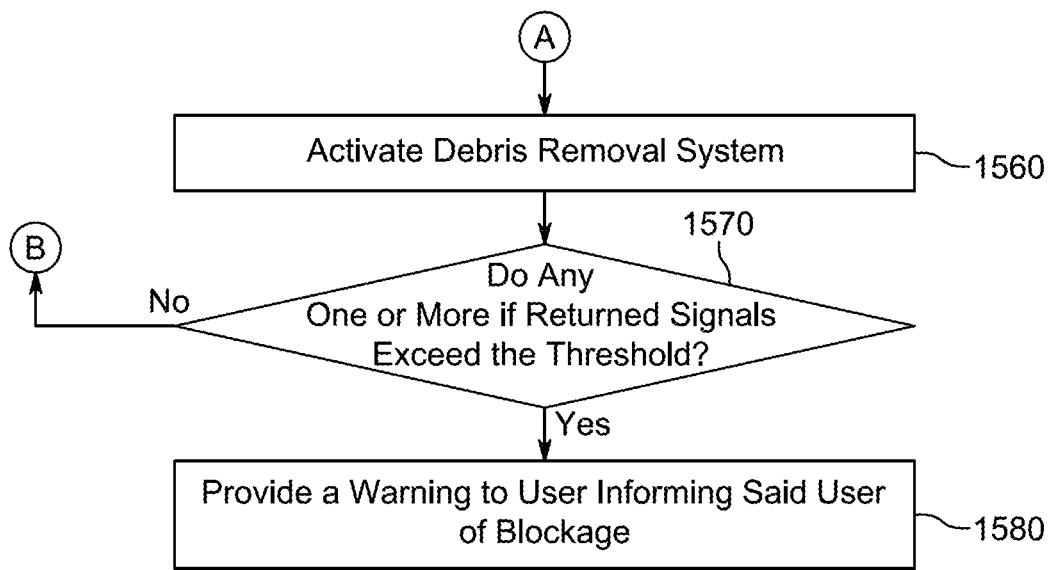

FIGS. 15A and 15B show illustrative process 1500 for using a LiDAR system for detecting whether debris is present according to an embodiment. Starting at step 1510, a first laser pulse is transmitted from a laser source. The first laser pulse interacts with first and second mirrors and a cover portion. FIG. 9 illustrates an example of LiDAR system having the mirrors and cover portion. At step 1520, a first return signal produced from the first laser pulse interaction with the first mirror is received. At step 1530, a second return signal produced from the first laser pulse interaction with the second mirror is received. At step 1540, a third return signal produced from the first laser pulse interaction with the cover portion is received. At step 1550, a determination is made whether any of the first, second, or third return signals exceed a threshold. If the determination is NO, process 1500 transitions to step 1555, which result in transmission of a subsequent laser pulse and a repeat of steps 1510-1550, but with respect to subsequent laser pulses and their respective returns. If the determination at step 1550 is YES, process 1500 can activate a debris removal system (at step 1560). For example, debris removal system 630 can be activated.

At step 1570, process 1500 can determine whether any of the return signals exceed the threshold (after the debris removal system has been activated). If the determination at step 1570 is NO, the process proceeds to step 1555. If the determination at step 1570 is YES, a warning may be provided to the user to inform the user of blockage (as indicated by step 1580).

It should be understood that the steps shown in FIGS. 15A and 15B are merely illustrative and that additional steps may be added or existing steps may be omitted.

Figure 16:
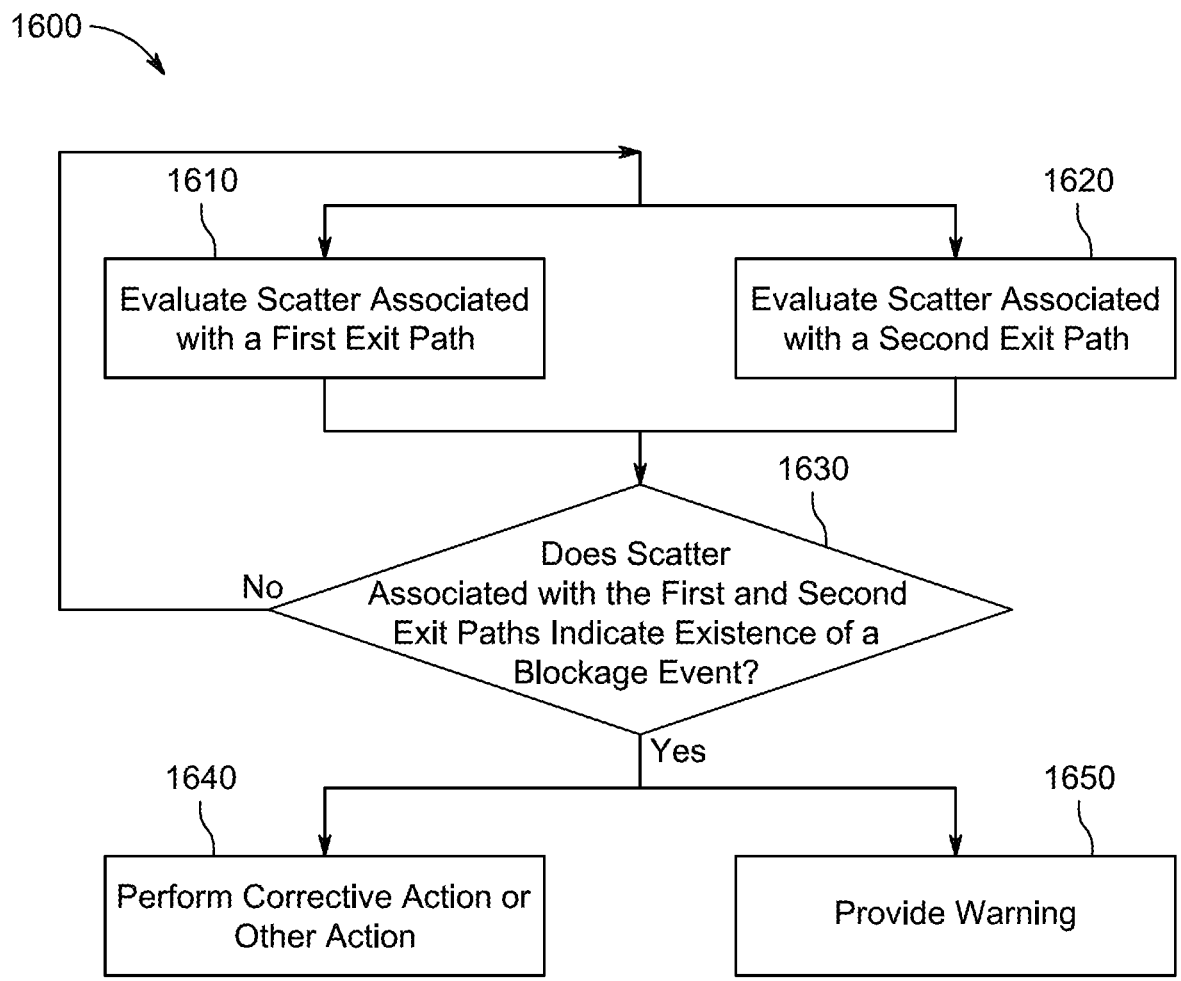
FIG. 16 shows an illustrative process for managing detection of debris on or within a LiDAR system according to an embodiment.

FIG. 16 shows illustrative process 1600 for managing detection of debris on or within a LiDAR system according to an embodiment. At step 1610, scatter return signals associated with a first light path are evaluated. At step 1620, scatter return signals associated with a second light path are evaluated. For example, FIG. 12 shows a LiDAR system with first light path 1160 and second light path 1170. At step 1630, a determination is made as to whether scatter return signals associated with the first and second exit paths indicate existence of a blockage event. If the determination is NO, process 1600 returns to the start of process 1600. If the determination is YES, process 1600 can perform a corrective action or other suitable action at step 1640 and/or provide a warning at step 1650. The corrective action can include activation of a debris removal system.

It should be understood that the steps shown in FIG. 16 are merely illustrative and that additional steps may be added or existing steps may be omitted.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-16, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A debris management system, comprising:
   at least a part of a light detection and ranging (LiDAR) system;
   a cover for the LiDAR system that comprises at least one light transmissive portion; and
   a debris removal system configured to remove debris from the at least one light transmissive portion of the cover, the debris removal system comprising a plurality of nozzles configured to direct compressed air over the at least one light transmissive portion of the cover of the LiDAR system, wherein the debris removal system is configured to determine which one or more of the plurality of nozzles to activate based on at least one blocked region of the cover and selectively activate one or more of the plurality of nozzles to remove debris from the LiDAR system.

2. The system of claim 1, wherein the debris removal system comprises an air compressor to supply the plurality of nozzles with the compressed air.

3. The system of claim 1, wherein the debris removal system comprises at least one compressed air tank to supply the plurality of nozzles with the compressed air.

4. The system of claim 1, wherein the debris removal system comprises at least one nozzle configured to spray a fluid onto the at least one light transmissive portion of the cover.

5. The system of claim 1, wherein the debris removal system comprises at least one additional nozzle configured to direct the compressed air to a component contained within the LiDAR system.

6. The system of claim 1, wherein the plurality of nozzles are positioned to direct both the compressed air from an compressed air tank and fluid from a fluid tank over the at least one light transmissive portion of the cover.

7. The system of claim 1, further comprising:
a debris monitoring system configured to monitor at least the cover to detect presence of debris existing on the at least one light transmissive portion.

8. The system of claim 7, wherein the debris monitoring system monitors scatter reflection signals that are generated by the LiDAR system to determine whether debris exists on the cover.

9. The system of claim 7, wherein the debris monitoring system monitors scatter reflection signals that are generated by the LiDAR system to determine whether debris exists within the LiDAR system.

10. A process for detecting presence of debris in connection with a light detection and ranging (LiDAR) system, the process comprising:
evaluating scatter return signals associated with a first light path;
evaluating scatter return signals associated with a second light path;
determining whether any of the evaluated scatter return signals associated with the first and second light paths indicate existence of a blockage event of a cover of the LiDAR system; and
in accordance with a determination that the blockage event exists, performing a corrective action to remove debris associated with the blockage event of the cover of the LiDAR system, the corrective action comprising:
determining which one or more of a plurality of nozzles to activate based on at least one blocked region; and
selectively activating one or more of the plurality of nozzles.

11. The process of claim 10, wherein the first light path is associated with far field object detection.

12. The process of claim 10, wherein the second light path is associated with near field object detection.

13. The process of claim 10, wherein the performing the corrective action comprises activating a debris removal system.

14. The process of claim 10, further comprising:
warning a user that the blockage event exists in accordance with the determination that the blockage event exists.

15. The process of claim 10, wherein the first light path comprises interactions with a first mirror, a second mirror, and the cover.

16. The process of claim 10, wherein the first light path comprises interactions with a near field mirror and the cover.

17. A process for clearing debris from a light ranging and detection (LiDAR) system, comprising:
monitoring the LiDAR system for at least one blocked region of a cover of the LiDAR system;
determining which one or more of a plurality of nozzles to activate based on the at least one blocked region; and
selectively activating the determined one or more of the plurality of nozzles to remove debris located at the at least one blocked region of the cover of the LiDAR system.

18. The process of claim 17, wherein the monitoring comprises:
transmitting a first laser pulse from a laser source, wherein the first laser pulse interacts with first and second mirrors and a cover portion;
receiving a first return signal produced from the first laser pulse interaction with the first mirror;
receiving a second return signal produced from the first laser pulse interaction with the second mirror;
receiving a third return signal produced from the first laser pulse interaction with the cover portion;
determining whether any of the first, second, or third return signals exceed a threshold; and
activating a debris removal system when any of the first, second, or third return signals exceed the threshold.

19. The process of claim 17, further comprising disabling the LiDAR system when the selectively activated one or more nozzles are not able to remove debris present at the at least one blocked region.

20. The process of claim 17, wherein the selectively activating the nozzles comprises ejecting at least one of compressed air and fluid.

* * * * *